(12) United States Patent
Wilkinson et al.

(10) Patent No.: US 8,538,136 B2
(45) Date of Patent: Sep. 17, 2013

(54) DIGITAL WATERMARK DETECTION IN 2D-3D CONTENT CONVERSION

(75) Inventors: Michael Shane Wilkinson, Newhall, CA (US); Thomas Bause, Brooklyn, NY (US)

(73) Assignee: NBCUniversal MEdia, LLC, New York, NY (US)

( * ) Notice: Subject to any disclaimer, the term of this patent is extended or adjusted under 35 U.S.C. 154(b) by 613 days.

(21) Appl. No.: 12/819,884

(22) Filed: Jun. 21, 2010

(65) Prior Publication Data

US 2011/0311128 A1 Dec. 22, 2011

(51) Int. Cl.
*G06K 9/00* (2006.01)
(52) U.S. Cl.
USPC ............................ 382/154; 382/100
(58) Field of Classification Search
USPC .......................... 382/100, 154, 232
See application file for complete search history.

(56) References Cited

U.S. PATENT DOCUMENTS

2006/0088186 A1\* 4/2006 Era ................................ 382/100

\* cited by examiner

*Primary Examiner* — Duy M Dang
(74) *Attorney, Agent, or Firm* — Fletcher Yoder, PC (57) ABSTRACT

A system and method are provided for analyzing 3D digital content to determine whether a watermark is detectable. The watermark may exist in 2D content that is converted to 3D, and in such cases, the survivability of the watermark to the conversion process is evaluated. An anticipated location of the watermark in left and right 3D images may be determined, and the detectability based upon the anticipated location. A report may indicate whether the watermark survived the conversion in one or both images, or neither. The process may be performed for single frames, sequences of single frames, or entire files containing many image frames. Watermark placement may also be proposed for locations in 2D content, 3D content, or both. Watermarks may similarly be placed in the content.

21 Claims, 5 Drawing Sheets

DIGITAL WATERMARK DETECTION IN 2D-3D CONTENT CONVERSION

BACKGROUND OF THE INVENTION

The present invention relates generally to the field of digital images, such as still pictures, video, film, multi-media, individual frames of such content, and so forth. In particular, the invention relates to the placement, detection, and/or preservation of digital watermarks in three-dimensional (3D) images, particularly those converted to such formats from two-dimensional (2D) digital content.

Visual content has been provided to audiences for centuries in various forms and for various purposes. Physical supports for such content have included canvas, hard supports (e.g., paper, board, etc.), and more recently, film. As a result of this long history, a vast pool of content exists that can be accessed by potential audiences and consumed or otherwise enjoyed through theaters, museums, various entertainment outlets, and so forth. Increasingly, however, such content is available online and virtually independent of any common viewing schedule as was the case in conventional cinemas.

Some decades ago advances were made in the presentation of stereoscopic images that were either separate or overlaid (superimposed and integrated) on one another and that were often viewed by special apparatus (e.g., glasses), to create the illusion of three dimensions. 3D presentations of multimedia content were often an entertaining novelty and little more. More recent developments in the technology, however, have resulted in much more convincing and compelling representations that are appreciated by audiences, primarily in cinemas. However, other playback media are rapidly evolving, including televisions, monitors, and so forth that could lead to a significant movement towards the presentation of entertainment content in 3D. Other reasons for 2D to 3D conversion include the substantially reduced costs of creating content in 2D as compared to 3D, as well as the ability to reuse existing 2D products. These developments, in combination with the existence of literally hundreds of thousands or millions of content items in legacy libraries are leading to a drive toward conversion of conventional 2D content to 3D.

For a number of reasons, digital watermarks are used in 2D digital content, such as still pictures, video, movies, multi-media presentations, and the like. Such watermarks may be visible and apparent to a user, such as a network icon in the corner of a television program. Other watermarks are not readily discernible by the viewer, and may serve various functions, such as to provide an indication of the source of origin of the content. Watermarks of the latter type may include so-called forensic marks, which may be used to trace content, to provide appropriate authorization for the reproduction of content, and to allow for at least some control of the unauthorized reproduction and dissemination of content. In all such cases, however, the watermark must remain detectable in the content and, where the watermark contains specific information, it must be appropriately readable at least to a degree that will allow reference to known sources, identifying materials, and the like.

A problem that will arise in the conversion of 2D content to 3D content which will affect the detectability and discernability of watermarks in the 3D content. In particular, watermarks in content converted from 2D to 3D may not be preserved or may be shifted (i.e., relative to the location of the watermark in the 2D content) to locations where they may not be easily detected. Accordingly, there is a need in the field for new techniques that will allow for verification of the detectability of a watermark in 3D content. There are also needs for improved systems for placing watermarks in 2D and/or 3D content.

BRIEF DESCRIPTION OF THE INVENTION

The invention provides a novel watermark analysis system designed to respond to such needs. The system may be used with new 3D content, but is particularly useful with existing 2D content converted to 3D formats. The system may be used for anticipating where a watermark that already exists in a 2D content item will appear in a 3D conversion. However, the system might also be used to appropriately place watermarks in 2D content, 3D content, or both. The system could be used to analyze whether a watermark has survived the conversion from 2D content to 3D content, and if so where the mark can be detected, as well as whether the mark can be adequately read.

Accordingly, in accordance with one aspect of the invention, a method is provided for processing left and right eye images of 3D content. The method includes, via a data processor, analyzing image data for the left and right eye images to determine a disparity between the images representing displacement of at least one feature from a position the feature would have in a corresponding 2D image. Based upon the disparity, an anticipated locations of the watermark are determined in the left and right images The image data is analyzed for the left and right eye images to determine whether the watermark is detectable in both images, and a user notification is generated based upon the detectability of the watermark in the images.

In accordance with another aspect of the invention, a method for processing left and right eye images comprises, via a data processor, analyzing image data for the left and right images to determine a disparity between the images representing displacement of at least one feature from a position the feature would have in a corresponding 2D image. A watermark is then added at a desired location in the 2D image or in at least one of the left and right eye images based upon the disparity or proposing to a user a desired location of the watermark in the 2D image or in at least one of the left and right eye images based upon the disparity.

The invention also provides a system for processing left and right eye images of stereoscopic 3D content. The system comprises an analysis component that analyzes the left and right eye images to determine anticipated locations of a watermark in each of the left and right eye images based upon a location of the watermark in a corresponding 2D image. A detection component that attempts to detect the watermark in the left and right eye images based upon the anticipated locations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
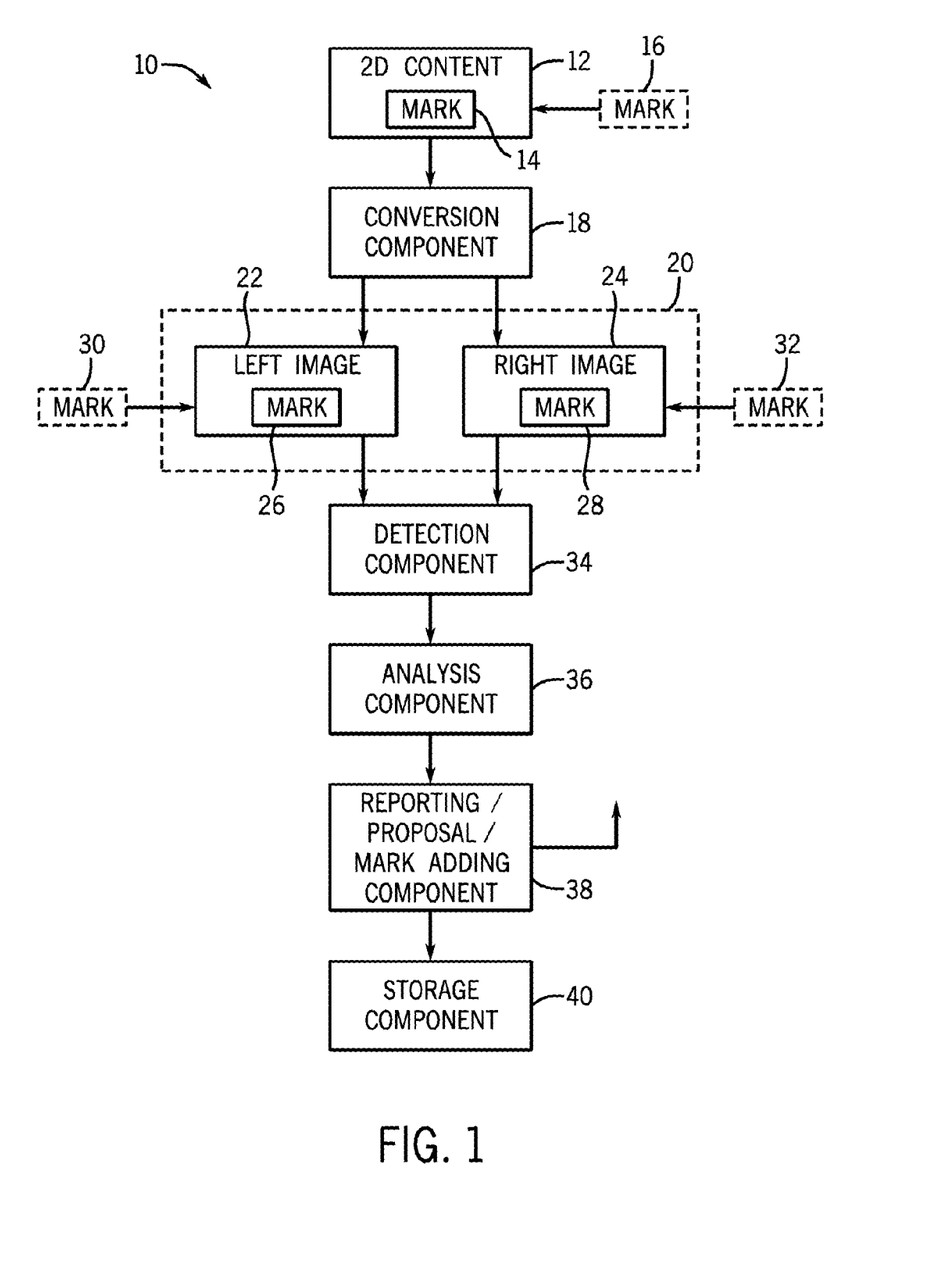
FIG. 1 is diagrammatical overview of a watermark analysis system in accordance with certain aspects of the invention.

Turning now to the drawings, and referring first to FIG. 1, a watermark analysis system is illustrated diagrammatically and represented generally by the reference numeral 10. The system illustrated in FIG. 1 allows for the conversion of 2D content to 3D content, with a watermark being contained digitally within the 2D content and the 3D content, respectively. In the illustration of FIG. 1, the system includes the conversion, with the watermark already present in the 2D content. Throughout the present discussion, however, it should be borne in mind that much of the processing described in the present disclosure may be performed after the 2D content has been converted to 3D content. Indeed, the processing may be performed on content originally created in 3D. Similarly, the processing may be performed to analyze certain features of the 2D content that result in different placements of similar features in the 3D content, such as to permit appropriate placement or at least suggestion of placement of watermarks in either the 2D content, the 3D content, or both.

Returning to FIG. 1, 2D content 12 is illustrated as containing a watermark 14. As will be appreciated by those skilled in the art, the 2D content may be any suitable visual content, such as still pictures, moving pictures, video, multimedia content, and so forth in any suitable form. The 2D content may originally be supported in a conventional film format, or any other physical support. Ultimately, however, the process will begin with conversion of the 2D content 12 to a digital format. The content will typically be stored on an archival storage system as described below. The content has a digital watermark 14 already included in it, or a mark may be added to it as illustrated by the optional block 16 in FIG. 1. As will also be appreciated by those skilled in the art, the mark may take any suitable form, such as various user-visible marks (e.g., icons, letters, logos, titles, and so forth). However, in many contexts, the watermarks may not be easily discernible to the user, or not discernible at all (at least to the human eye), and may be placed in locations that are intended specifically hide the watermarks. This will be particularly the case of digital marks used for forensic purposes and the like. The particular technologies for creation and encoding of the watermarks in the digital content are well known in the art.

Block 18 in FIG. 1 represents a conversion component which will typically comprise one or more appropriately programmed computers. The conversion component will also include programming or logic for analyzing the 2D content and for breaking the content down into 3D content as indicated generally by reference numeral 20. Here again, the conversion component 18 may be any suitable conversion processing generally known in the art or subsequently developed. The conversion may be fully automated or manually-assisted. In many cases, the conversion component will identify elements in scenes that would appear in a foreground or closer to a viewer, as opposed to features or elements that may appear farther away. As described more fully below, the processing of the 2D content executed by the conversion component may distinguish between these features of the views by shifting information (known as disparity information as discussed below) differently for foreground features as compared to more distant features. Changes in pixel intensity, grey levels and so forth result in the appearance of identical objects in the left and right signals at different spatial locations in the two images, creating an illusion of depth to the viewer. The 3D content will consist of two images, one intended to be viewed by the left eye and one intended to be viewed by the right eye. In the present discussion, these images that make up the 3D content may be referred to as left and right 3D images, or as left and right eye images. The 3D content may include depth or disparity information that is pixel-based, and such information will typically be provided in a depth or disparity map. The left image 22 will thus be presented in the format such that it will be viewed by the left eye, while the right image 24 will primarily be viewed by the right eye. Various devices may be used to encourage or trigger such image recognition by the eyes (and the optical system), such as specially-adapted glasses, and so forth. As a result of conversion to 3D content 20, a watermark 26 may appear in the left image and/or a watermark 28 may appear in the right image.

The watermarks in the left and right views may be the same or may be different. That is, in certain cases the watermarks may have the appearance of overlying one another, and may convey the same information. This may allow for coincidence of the marks when these are apparent to the viewer. Even when not apparent to the viewer, providing the same information in both images may allow for tracking of the use of left images separately from the use of right images, such as for forensics purposes, licensing purposes, and so forth. In other cases, the left and right watermarks when considered together may convey complementary information difficult or impossible to convey in a single 2D watermark alone (effectively expanding the "payload" of the watermark data). When the marks are not detectable in either the left or right images after the conversion process, new marks may be added as indicated by optional blocks 30 and 32 in FIG. 1. As discussed more fully below, the present disclosure provides the mechanisms for detecting whether marks 26 and 28 are present in the left and right images, as well as the possibility for appropriately placing such marks in the images.

Element 34 in FIG. 1 is a detection component which will typically include one or more appropriately programmed computers and software for detection of the watermarks. The detection component 34 itself may be similar to those used for detection of watermarks in 2D images. That is, these may include automated or semi-automated readers capable of detecting watermarks appropriately placed in specific frames of digital content. As will be appreciate by those skilled in the art, the detection component may be based upon optical methods (e.g., visualizing the watermark placed in reconstructed images) or upon digital techniques adapted to detect watermark data in a bit stream or file representative of the images when reconstructed. Based upon such detection, then, an analysis component 36 determines whether marks have been detected, their placement, whether they can be appropriately read. The detection component 34 and analysis component 36 may work in conjunction to calculate where marks should be anticipated in the left and right 3D images (based upon a known location of the watermark in the 2D image), and to attempt detection of the watermarks in such determined locations as described more fully below.

Based upon the analysis and detection, then, reporting/proposals/mark adding component 38 may operate to provide reports or proposals to a user. In general, it will be of interest for the cases of existing watermarks in 2D content to determine whether the marks survived in the left and right 3D images. If the marks appropriately survived in the images and are readable, this may be reported to a user as a quality control metric. On the other hand, if one or both marks did not survive, this may also be reported. Component 38 may also serve the purpose of proposing to the user appropriate placement of marks in left and right 3D images, or even in 2D content such that they will have a higher likelihood of being appropriately located and read in the 3D images. Moreover, component 38 may also serve the purpose of actually adding the mark to such appropriate locations in the 2D content, the 3D content, or both. For this reason, an arrow is illustrated from component 38 looping back to the conversion process to indicate that such marks may be placed, replaced, altered, and the like. Here again, the watermarks in the left and right images may be the same or different from one another.

Finally, a storage component 40 is illustrated. This storage component will typically be some sort of archival storage (e.g., high density storage, optical storage, and such) where the 3D content may be permanently stored for reproduction, distribution, and so forth. A wide range of such storage components may be employed, and indeed, many such components may be configured to interact for dissemination of the 3D content. The storage component may also include archival storage similar or identical to that from which the 2D content was drawn.

Figure 2:
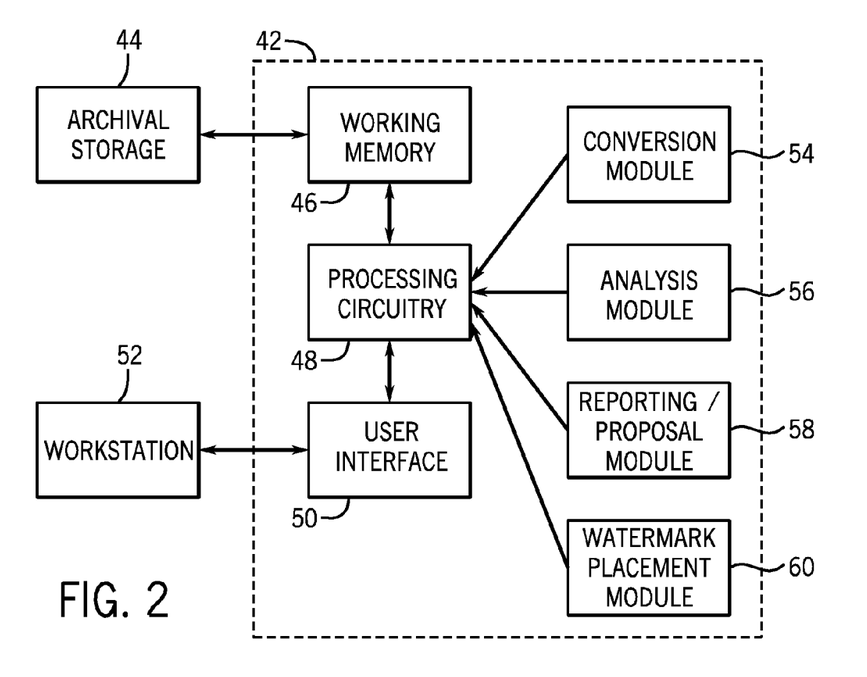
FIG. 2 is a diagrammatical representation of certain functional circuitry that might be used in the system of FIG. 1.

FIG. 2 represents exemplary functional components that might be included in system of the type shown in FIG. 1. For example, a processing system 42 is illustrated that might include one or more programmed computers executing code stored on one or more memory devices. The processing system 42 will draw 2D and/or 3D content from an archival storage 44. As noted above, the archival storage 44 will contain digitized 2D or 3D content, which may itself be derived from legacy materials, such as conventional film, and so forth. The stored content may also include 3D content but that is only 2D imagery (e.g., only the left eye view of the 3D content that is taken and distributed as 2D content). The content may be transferred to one or more working memory circuits 46 in the processing system. The memory will serve the content processing circuitry 48 for the conversion, analysis, and any operations desired on the content. The processing circuitry 48 may include any suitable processor, such as conventional microprocessors, coprocessors, field programmable gate arrays, and so forth and that can execute instructions stored in the processing system as described below.

A user interface circuit 50 will typically be associated with the processing circuitry to allow for interaction with the processing system 42. The interface circuitry may include, for example, appropriate video drivers, input and output circuits that can be coupled to one or more workstations 52. An operator interfacing with the workstation, then, can drive the conversion, analysis, watermark placement, and any other operations performed by the processing circuitry. In certain embodiments, it is contemplated that some of the operations will be almost fully automated so that an operator may be provided with certain reports or quality metrics alone. That is, the processing circuitry may be capable of performing conversions, or simply analyzing 3D content to determine whether watermarks are appropriately placed and readable. In certain contexts, the processing circuitry may, in an automated fashion, carry out such detection, and even placement of watermarks in the 2D content, the 3D content, or both. Accordingly, the operator at workstation 52 may perform a supervisory or quality control function only.

In the embodiment illustrated in FIG. 2, certain software or firmware modules are provided in the system for carrying out the system functionality. In addition to any desirable software that may be included in any conventional computer system (e.g., viewers, browsers, text entry software, etc.), the system illustrated in FIG. 2 includes a conversion module 54, an analysis module 56, a reporting/proposal module 58, and a watermark placement module 60. Other applications or modules may also be provided, such as a rectification module that can be used to eliminate geometric distortion in or between the images. It should be noted, however, that depending upon the particular functions carried out by the processing circuitry, some of these modules need not be present. For example, as noted above, the conversion module 50 may provide instructions to the processing circuitry to convert 2D content to 3D content where desired. However, certain of the processing described in the present disclosure may be performed on content that has already been converted to 3D images. Accordingly, the processing circuitry need not carry out further conversion in such situations, but will generally use disparity information, as discussed below, to determine locations of the marks in the 3D content. The analysis module 50 allows for analysis of the anticipated location of watermarks in the 3D content, and/or for determining where a watermark may be placed in 2D content and/or 3D content so as to best enable later detection and reading. Exemplary analysis performed by analysis module 56 is described more fully below. The reporting/proposal module 58 may be used to generate reports for a user indicating whether watermarks are detectable in 3D content, the particular location in frames of the 3D content, and, where desired, for making proposals as to placement of watermarks in the 3D content or the 2D content that is to be converted to 3D content. Finally, watermark placement module 60 may be used to carry out the actual encoding or placement of watermarks in the 2D content, the left and/or right images of the 3D content, or both. The modules may be formulated in any suitable programming code and written in any desired language. In general, where provided, the modules will be stored in a local memory that can be accessed by the processing circuitry for carrying out the executable instructions encoded in each module.

Figure 3:
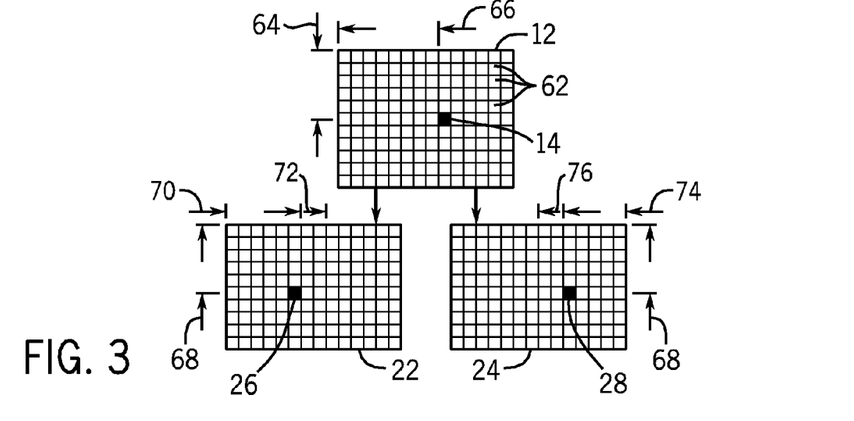
FIG. 3 is a representation of 2D content converted to 3D content and illustrating one possibility for the shifting of a watermark in 2D content to locations in left and right views of the 3D content.
Figure 4:
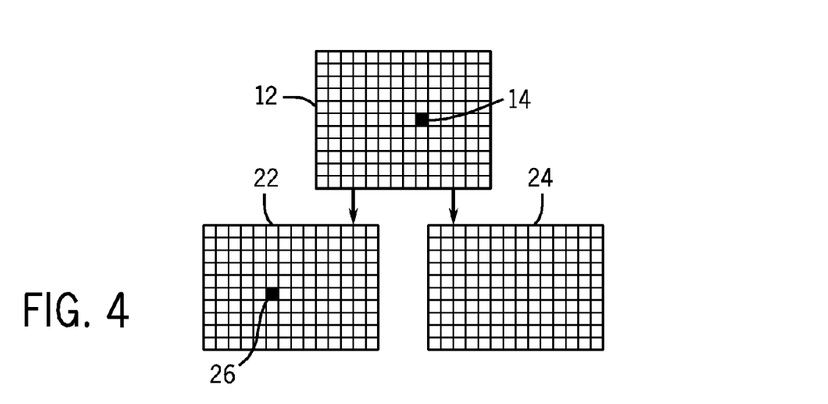
FIG. 4 is a similar illustration of another possibility in which the watermark is not visible (or was destroyed during conversion, or was never applied) in the right view of the 3D content.
Figure 5:
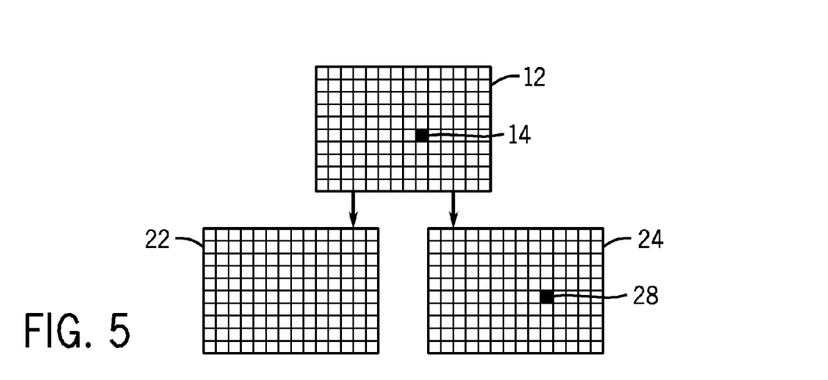
FIG. 5 is a further similar representation in which the watermark is not detectable (or was destroyed during conversion, or was never applied) the left view of the 3D content.

FIGS. 3, 4 and 5 represent potential outcomes for the detectability of a watermark in converted image data. For example, FIG. 3 illustrates an image frame of 2D content 12, as well as corresponding frames of 3D content 22 and 24. As noted above, the 3D content left and right views 22 and 24 will be converted from the 2D content 12 in the conversion process. As will be appreciated by those skilled in the art, the frames in each case may be considered to consist of pixels 62 (discrete picture elements) that may be arranged in an array to form an image. Depending upon the particular technology utilized, these pixels may be comprised of a single color or a combination of colors that provide the illusion of a composite image. Moreover, the pictures themselves may be conveyed to a user and displayed as a static view, but in many cases will be scanned in various protocols to create the illusion of a static image or of a moving image.

In FIGS. 3, 4 and 5, a watermark 14 is indicated as being placed in the 2D content 12. Although illustrated as a single pixel in the image, those skilled in the art will recognize that the watermark itself may be placed in various picture elements or even a combination of adjacent or non-adjacent picture elements. Similarly, the watermark may be placed in certain image features that may tend to mask the watermark so that it is not visible or only slightly visible to a human viewer. For illustration sake, however, the watermark is illustrated as a single viewable pixel in the images. In the case of FIG. 3, the watermark 14 will correspond to a pair of watermarks 26 and 28 that have survived in the 3D content. However, the placement of the watermarks will typically change. That is, watermark 14 in the 2D content may be found at a particular vertical or Y-location 64 and at a particular horizontal or X-location 66. These positions may shift in the 3D views. In general, it may be anticipated that the Y-location will remain the same as indicated by reference numeral 68, while the X-locations may vary as indicated by reference numerals 70 and 74 for the left and right views, respectively. This shifting will typically depend upon whether the watermark in the 2D image is placed in a location that will correspond to a foreground feature (high-value disparity) or a more distant feature (low-value disparity) of the image as interpreted by a viewer. In the illustration of FIG. 3, then, a displacement or disparity 72 may exist in the left view 22 as compared to the placement in the 2D image, while a further displacement or disparity 76 may exist in the right view. In any case, FIG. 3 illustrates a situation in which the watermark has survived in both left and right views, but the placement of the watermark may need to be determined.

By contrast, FIG. 4 illustrates a situation in which the watermark 14 is detectable in the left 3D view 22 as indicated by reference numeral 26, but no watermark, or no discernible watermark has survived in the right view 24. In the opposite case, shown in FIG. 5, the watermark 14 of the 2D image 12 has not survived in the left view, or is not detectable in the left view, but has survived and is detectable in the right view as indicated by reference numeral 28. As will be appreciated by those skilled in the art, a fourth case, opposite to FIG. 3 and a hybrid of FIGS. 4 and 5 may exist in which the watermark did not survive in either the left or right 3D views or is not detectable or readable in either view.

Figure 6:
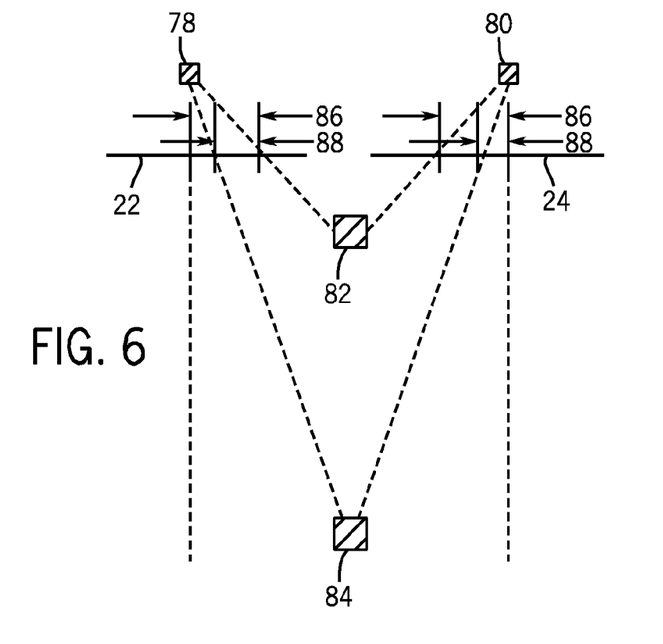
FIG. 6 is a diagrammatical representation of the shift in an image plane of the location of a feature, in this case a watermark, for locations in a foreground as compared to locations in a background.
Figure 7:
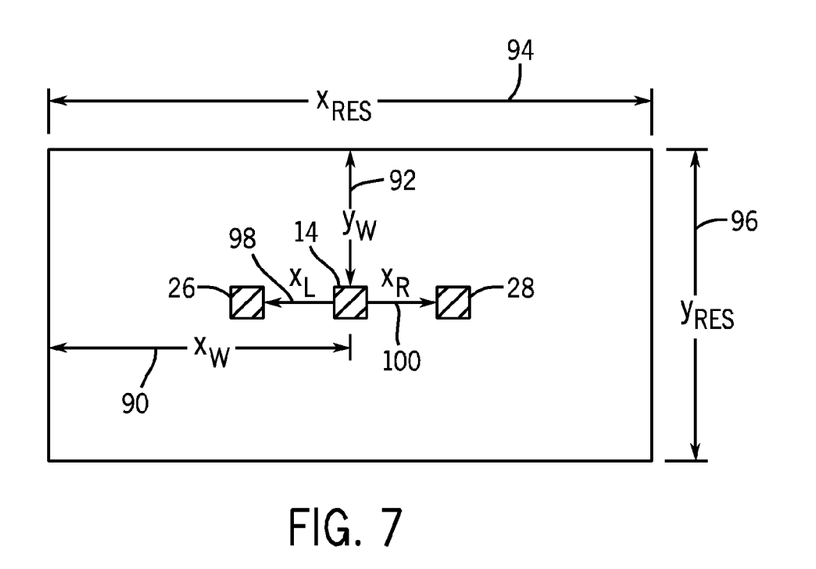
FIG. 7 is a diagrammatical representation of such a shift in locations of a watermark as might be perceived by a viewer.

The displacement of the watermark may be understood more generally from FIGS. 6 and 7. FIG. 6 illustrates the displacement or disparity in an image plane based upon whether an object appears closer to the viewer or farther away. It should be noted that this terminology, in the case of a 2D representation of 3D space means that a feature that is recognizable in a satisfactory manner to a viewer appears closer than another recognizable feature appears in the representation. That is, to take a simple example, an image of a tree near a house in a foreground may appear closer in an image than in a mountain range in the distance. This same phenomena occurs in the placement of digital watermarks that can be discerned in the left and right views of 3D images, particularly if the watermarks are hidden in objects that may themselves appear at different depths to the viewer. In the diagrammatical illustration of FIG. 6, a left focal point 78 is illustrated along with a right focal point 80. In the case of the human visual system, these focal points will correspond to the locations on the left and right retinas on which visible images are formed. Image planes are illustrated corresponding to left and right 3D images 22 and 24 that themselves comprise the 3D content.

The figure represents a relatively close feature 82 that may be considered a foreground feature or a placement of a watermark in or around a foreground feature. A more distant feature 84 is also illustrated that may correspond to a watermark placed on or around a more distant recognizable feature. For example, watermark 82 may be placed on or around a tree or house in a foreground, where as a watermark 84 may be placed on a distant mountain range recognizable by the viewer. Reference numeral 86 and 88 represent disparities in the locations of these watermarks or features in the image plane of each of the left and right views. That is, as compared to the location of a similar article in a 2D image, represented by the vertical broken lines extending from each focal point, the near field article will be displaced relatively as indicated by reference numeral 86, whereas the far field object will be displaced less as indicated by reference numeral 88.

FIG. 7 illustrates this displacement or disparity in the actual image. In particular, the watermark 14 in a 2D image may be displaced to the left and/or to the right as indicated by watermarks 26 and 28 as they will be placed in separate 3D images. Reference numeral 90 represents the horizontal location of the watermark 14, whereas reference numeral 92 represents the vertical location. Reference numeral 94 in FIG. 7 represents the horizontal resolution, whereas reference numeral 96 represents the vertical resolution. Due to the disparity described above, the location of watermark 26 may be shifted as indicated by reference numeral 98, whereas watermark 28 may be shifted as indicated by reference numeral 100 from their unified position in the 2D image.

As described below, the present methodology allows for calculation of disparity values $X_D$ that can be determined by the relative movement of the features associated with watermarks in the 2D to 3D conversion. If the movement of the watermark is the same, this displacement can be defined as follows, using the nomenclature called out in FIG. 7:

$$X_L = -X_D;$$

and $$X_R = +X_D;$$

where $X_L$ is the displacement of the watermark in the left 3D image as compared to its location in the 2D image, the value $X_R$ is a similar displacement of the watermark in the right 3D view, and $X_D$ is the disparity value (which results from the 2D to 3D conversion process or a later image processing step, subtracting the left image form the right image to determine the difference). The absolute value of the watermark in the 2D source image is determined by the coordinate pair ($X_W$, $Y_W$), again using the nomenclature called out in FIG. 7. In these cases, the reference or zero point is determined from the upper left corner, although other coordinate systems may, of course, be used. For thus analyzing the location (and survival) of a watermark from a 2D to 3D conversion, the displacement of the surviving watermark in the left view and/or the right view is given by the vertical coordinate $Y_W$ and the horizontal displacement $X_L$ and/or $X_R$ which also represents the disparity of the 3D image in regards to the original 2D image, at least for this feature. In general, the vertical displacement of the watermark may not be considered due to the fact that the vertical displacement generally does not occur between the 2D and 3D images.

The new absolute watermark position can then be calculated as follows:

$$X_{WL(abs)} = X_W - X_L;$$

and $$X_{WR(abs)} = X_W + X_R;$$

for the left and right images, respectively. Moreover, it may be appropriate to calculate the watermark position independently (relative) from the screen resolution to take scaling of the image into account. The above relationships may thus be modified as follows:

$$X_{WL(rel)} = X_{RES}/(X_W - X_L);$$

and $$X_{WR(rel)} = X_{RES}/(X_W + X_R)$$

for the left and right 3D views, respectively, where the value of $X_{RES}$ is the horizontal resolution illustrated in FIG. 7.

As described more fully below, this methodology may allow for the determination of the new location of a watermark, or at least its anticipated location in separate 3D views based upon the location of a mark in a 2D view. As also described below, the methodology may permit evaluation of whether a watermark has survived in left and right 3D views by searching the watermarks in the anticipated locations. This process may, in fact, simply be useful to narrow a search area in an image using an approximated watermark location.

Figure 8:
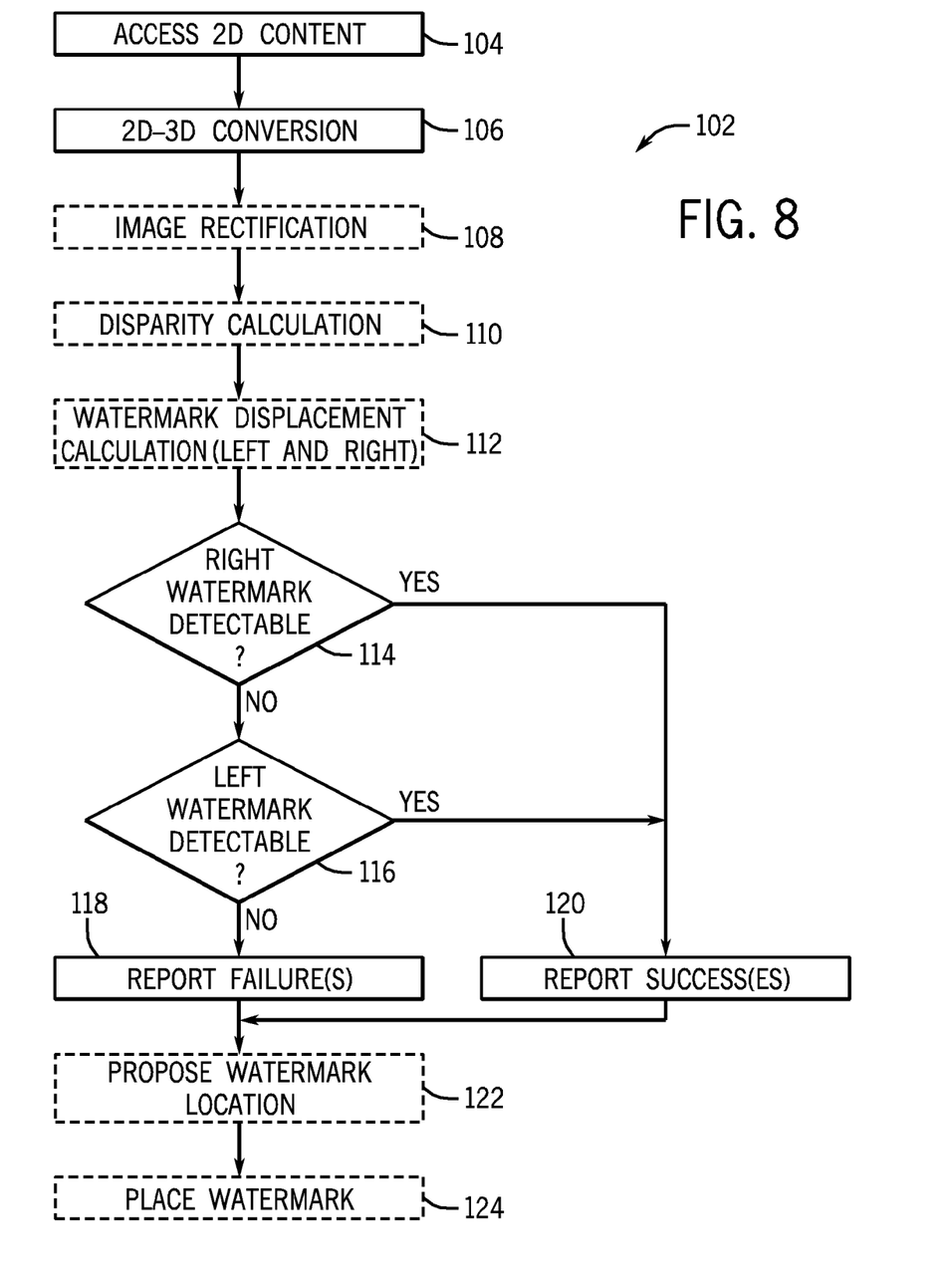
FIG. 8 is a block diagram illustrating exemplary steps in logic for testing the detectability and location of a watermark in 3D content.

FIG. 8 illustrates exemplary logic for detecting whether watermarks have survived in a 2D to 3D conversion process, as well as for proposing or placing watermarks where desired. The processing logic, indicated generally by reference numeral 102 begins with accessing 2D content as indicated by reference numeral 104. Again, the 2D content will be in digital format and, in this case, will include a watermark. The watermark may be placed in the content at this stage or it may be pre-existing at a known location. At step 106 the 2D content is converted to 3D content which will include at least one image frame comprising data intended to be recognized by the left eye and data intended to be recognized by the right eye. It should be noted at steps 104 and 106 may be performed beforehand followed by the additional processing summarized in FIG. 8. At step 108 the 3D images may be rectified or registered with one another in a generally conventional manner. This process will typically include the alignment of the left and right data and its super position.

At step 110 a disparity calculation is performed. It should be noted that in some or many cases, this information may be provided by the 2D to 3D converter, which may be a separate entity. In such cases, step 110 may be unnecessary. This disparity calculation will allow for determining the disparity in the images, and particularly of certain features within the images. The disparity calculation may be performed in accordance with the methodology described above, and will result in values that provide a relative indication the degree to which features have been displaced in the 3D views as compared to their placement in the 2D image. Based upon the disparity calculation, watermark displacement may be calculated for the left and right views as indicated by reference numeral 112. As summarized above, the watermark location will typically move horizontally with little or no movement vertically. As also described above, the movement of a watermark in the 3D images may be predicated on whether it is apparent in a foreground feature or in a background feature, with lesser displacement anticipated for background feature watermarks and more displacement anticipated for foreground feature watermarks.

With the anticipated location of the watermark in the 3D images thus computed, at step 114 the methodology may allow for determining whether the watermark is detectable in the right image. It is presently contemplated that these processes may be carried out in a fully automated or semi-automated manner, such that an appropriately programmed computer may determine whether the watermark is detectable and readable by examining either the image data itself or a reconstructed image based upon the data, searching within the neighborhood calculated in step 112. Following this test, the process may advance to the left watermark to determine whether it is detectable in the position calculated at step 112, as indicated by block 116. Here again, the detection may be carried out automatically or with human assistance, and will typically involve searching within the neighborhood identified for the anticipated location of the watermark in the left view. If either watermark or both are not detectable in the 3D images, a failure report will be generated at step 118. If one or both of the watermarks is detectable, a success report will be generated as indicated at step 120. As will be apparent to those skilled in the art, the particular code implemented for carrying out this process may allow for hybrid reports, particularly where one watermark is detectable and readable in the 3D images while the other is not. The report may take the form of a quality control metric provided to the user at a workstation as indicated above, or any suitable form of notification, such as a listing or locations of particular frames where the watermarks failed or would be anticipated to fail.

Additional steps in the logic may include proposal of watermark locations as indicated at step 122. That is, depending upon the placement of the watermark 2D image, the survivability of the watermark in the 3D images may be enhanced or, on the contrary, the likelihood that the watermark will not survive may be higher. By way of example only, a watermark placed on the side of a structure in a 2D image may tend to be visible in one view in the 3D image set but not visible in the opposite view. Accordingly, such locations would not be preferred. Similarly, watermark locations in the 2D view that would correspond to background structure (e.g., a distant mountain range) may be preferred over locations in foreground structure where higher disparity and displacement would be anticipated. Such proposals may be provided to the user for placement in the 2D image data, the 3D image data, or both. Here again, the watermarks in the left and right 3D images may be the same or different. Similarly, as indicated at step 24, the logic may call for actual placement of watermarks. The placement of the watermark in the 2D image, the 3D image or both, may follow similar rules to those for the proposed placement of watermarks. In all cases, the purpose would be to enhance the survivability of the watermark in the 2D to 3D conversion process, or simply to place the watermark in one or both of the left and right 3D images where the watermark may not have survived or where no watermark may be present at all. Thus, it should be noted that the process may be used for initial placement of watermarks in 3D content where no such watermark existed (or where a watermark did not survive), and/or for initial placement in 2D content where no such watermark existed. Here again, it may be preferred to place watermarks in left and right eye images of the 3D content in areas where there is little disparity or no disparity at all.

Figure 9:
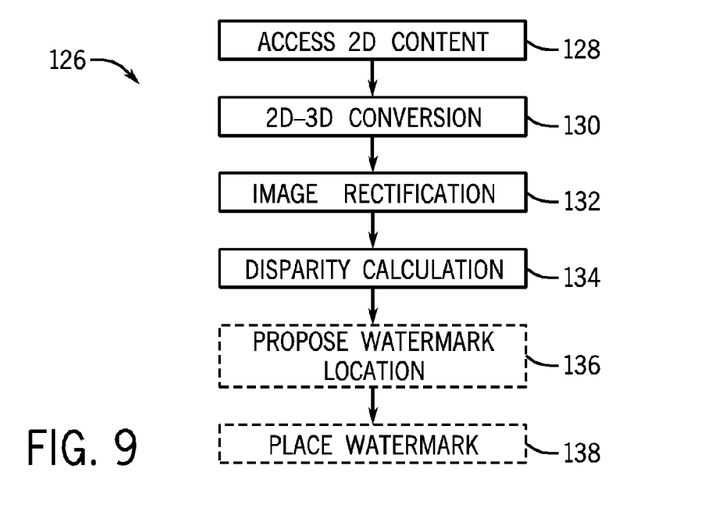
FIG. 9 is a similar block diagram illustrating exemplary logic for proposing or placing a watermark directly into 2D or 3D content.

The latter processing is summarized generally in FIG. 9. This watermark proposal and placement process is indicated generally by reference numeral 126. This logic may begin with accessing the 2D content as indicated by step 128, followed by its conversion to 3D content in step 130. Here again, these steps may be performed beforehand with subsequent processing performed by the same or separate post-processing system. As before, the images may be rectified as indicated at step 132 and the disparity calculation as indicated at step 134. Because no watermark existed in either the 2D content or the 3D content, or both, the system may propose a watermark location as indicated by step 136. Where no watermark existed in the 2D content, this proposal may be based upon an intelligent analysis of where the watermark may be placed in the 2D content to enhance its survivability in the 2D to 3D conversion. At step 138, similarly, the watermark may simply be placed in the 2D content to enhance its survivability in the conversion.

It should be noted that in the logic summarized in FIG. 8 and FIG. 9, the watermark proposal and placement, where desired, will typically take into account the manner in which the image is broken down in the conversion process for shifting of certain features to provide the illusion of three dimensions or depth. Accordingly, the watermark placement may be made in the manner that is consistent with the content itself, and with individual frames of the content where desired. It should also be noted that in all cases the watermark itself is stored along with the content, as well as data relating to the placement of the watermark in the 2D content, and each frame of the 3D content.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for processing left and right eye images of 3D content, comprising:
    via a data processor, analyzing image data for the left and right eye images to determine a disparity between the images representing displacement of at least one feature from a position the feature would have in a corresponding 2D image;
    based upon the disparity, determining an anticipated locations in the left and right images, respectively, of a watermark;
    analyzing the image data for the left and right eye images to determine whether the watermark is detectable in both images; and
    generating a user notification based upon the detectability of the watermark in the images.

2. The method of claim 1, comprising determining whether the watermark is readable in the left and right eye images, and generating a user notification based upon the readability of the watermark in the images.

3. The method of claim 1, comprising converting the 2D image to the left and right eye images.

4. The method of claim 3, comprising adding the watermark to the 2D image.

5. The method of claim 4, wherein the watermark is added to the 2D image based upon the detectability of the watermark in the left and right eye images.

6. The method of claim 1, comprising adding the watermark to at least one of the left and right eye images.

7. The method of claim 6, comprising adding a first watermark to the left eye image and a second, different watermark to the right eye image.

8. The method of claim 1, comprising proposing a location for the watermark in the 2D image based upon the detectability of the watermark in the left and right eye images.

9. The method of claim 1, comprising proposing a location for the watermark in the 2D image is based upon the disparity.

10. The method of claim 8, wherein the proposed location is a location resulting in a low disparity or no disparity between the left and right eye images as compared to other locations in the 2D image.

11. A method for processing left and right eye images, comprising:
    via a data processor, analyzing image data for the left and right images to determine a disparity between the images representing displacement of at least one feature from a position the feature would have in a corresponding 2D image;
    adding a watermark at a desired location in the 2D image or in at least one of the left and right eye images based upon the disparity or proposing to a user a desired location of the watermark in the 2D image or in at least one of the left and right eye images based upon the disparity.

12. The method of claim 11, comprising determining detectability of the watermark in the left and right eye images based upon the disparity, and adding the watermark to the 2D image or to at least one of the left and right eye images based upon the detectability of the watermark in the left and right eye images.

13. The method of claim 11, wherein the desired location is a location resulting in a low disparity or no disparity between the left and right eye images as compared to other locations in the 2D image.

14. The method of claim 13, comprising converting the 2D image to the left and right eye images.

15. The method of claim 14, wherein a watermark is present in the 2D image prior to the conversion.

16. A system for processing left and right eye images of stereoscopic 3D content, comprising:
    an analysis component that analyzes the left and right eye images to determine anticipated locations of a watermark in each of the left and right eye images based upon a location of the watermark in a corresponding 2D image; and
    a detection component that attempts to detect the watermark in the left and right eye images based upon the anticipated locations.

17. The system of claim 16, comprising a conversion component that converts the 2D image to the left and right eye images.

18. The system of claim 16, comprising a reporting component that reports to an operator whether the watermark was successfully detected in the left and right eye images.

19. The system of claim 16, comprising a component that proposes to an operator a location for the watermark in either the left eye image, right eye image, both eye images, or the 2D images, or any combination thereof.

20. The system of claim 16, comprising a placement component that places the watermark in either the left eye image, right eye image, both eye images, or the 2D images, or any combination thereof.

21. The system of claim 16, wherein the analysis component determines the anticipated locations based upon a determination of a disparity value for at least one feature of the left and/or right eye image as compared to the corresponding 2D image.

* * * * *